United States Patent [19]

van Steenbrugge et al.

[11] Patent Number: 4,937,816
[45] Date of Patent: Jun. 26, 1990

[54] SINGLE-CHANNEL COMMUNICATION BUS SYSTEM AND STATION FOR USE IN SUCH A COMMUNICATION BUS SYSTEM

[75] Inventors: Bernard van Steenbrugge; Henricus F. A. de Leeuw, both of Eindhoven, Netherlands

[73] Assignee: U.S. Philips Corporation, New York, N.Y.

[21] Appl. No.: 286,575

[22] Filed: Dec. 19, 1988

[30] Foreign Application Priority Data

Mar. 16, 1988 [NL] Netherlands ............. 8800639

[51] Int. Cl.$^5$ ............................................. H04J 3/26
[52] U.S. Cl. .................................. 370/85.6; 370/94.1; 340/825.07
[58] Field of Search ................ 370/85, 94, 85.6, 94.1; 340/825.06, 825.07, 825.5, 825.52

[56] References Cited

U.S. PATENT DOCUMENTS

| | | | |
|---|---|---|---|
| 4,429,384 | 1/1984 | Kaplinsky | 370/85 |
| 4,715,031 | 12/1987 | Crawford et al. | 370/85 |
| 4,750,176 | 6/1988 | Van Veldhuizen | 370/85 |
| 4,779,089 | 10/1988 | Theus | 370/85 |
| 4,818,985 | 4/1989 | Ikeda | 370/85 |

Primary Examiner—Douglas W. Olms
Assistant Examiner—Melvin Marcelo
Attorney, Agent, or Firm—Anne E. Barschall; Jack E. Haken

[57] ABSTRACT

A single-channel communication bus system allows for the use of several master stations by way of an arbitration organization. A message contains a master address which is subjected to an arbitration operation, a slave address with space for a slave address acknowledge bit, a control signal with space for a control acknowledge bit, and one or more data bytes. Per data byte an indication of the "last" byte is also transmitted and space is reserved for a data acknowledge bit. When a data acknowledge bit is not correctly received, the data byte in question is repeated until at the most the maximum frame length is reached. The remainder of a message is then placed in a next frame. If an address or control acknowledge bit is not correctly received, the relevant frame is terminated.

33 Claims, 1 Drawing Sheet

SINGLE-CHANNEL COMMUNICATION BUS SYSTEM AND STATION FOR USE IN SUCH A COMMUNICATION BUS SYSTEM

BACKGROUND OF THE INVENTION

The invention relates to a single-channel communication bus system whereto a series of stations are connected, that is to say at least one master station and at least one slave station, each master station comprising arbitration means for transmitting a start signal, followed by a priority signal, and for detecting a negative or a positive arbitration result, in dependence of the start and/or priority signal of any other station, and also comprising transmission means for transmitting a message signal after a positive arbitration result. A system of this kind is known from Netherlands Patent Application 8002345 and the corresponding U.S Pat. No. 4,429,384. Single-channel buses may comprise a single conductor or a symmetrically driven twisted pair of conductors; the bus can alternatively be realized by means of optical means. The arbitration means are effective in that the bus realizes a wired logic function, for example a wired AND-function. This can be realized by means of an open collector connection of the stations and the like: each station supplying a logic 0 then masks any logic 1 delivered by any other station. The operation is the same in the case of an optical system.

The known system is well-defined at the bit level, but does not describe the actions to be undertaken when one of two communicating stations is incapable of correctly processing the information applied to it.

SUMMARY OF THE INVENTION

Among other things, it is an object of the invention to provide simple adaptations for enabling the control of the information stream between the transmitter station and the receiver station so that a high degree of certainty exists that the information is correctly received and that, in the case of errors upon reception, advantageous steps are taken in order to realize an effective transmission by a suitable choice between deactivation/repetition of the data. This object is achieved according to one of the aspects of the invention in that the transmission means have a first position for transmitting a slave station address and for the directly subsequent detection of an addres acknowledge bit, and also have a last position for transmitting a series of data bytes each time cum signaling of a "last" data byte, and for the directly subsequent detection of a data acknowledge bit, that under the control of an address acknowledge bit received there is activated a next position, however, the transmission means being deactivated in the absence of an address acknowledge bit, and that under the control of an absent data acknowledge bit the transmission means are set to a repeat position for the relevant data byte in order to assume the last position again under the control of the data acknowledge bit received as yet, the transmission means also being deactivated when an upper limit as regards the number of data bytes transmitted is reached. The address signal is not repeated. The absence of the address acknowledgement usually means that the relevant station is defective, absent or inactive. In that case repetition does not make sense. The absence of data acknowledgement usually means that a receiver buffer of the relevant station does not have free capacity, which is usually a temporary situation; in that case repetition is attractive. By imposing an upper limit as regards the number of bytes (the repetitions are also taken into account), monopolization of the bus can be avoided.

According to a second aspect, the transmission means preferably assume a control position under the control of the address acknowledge bit, for the transmission of a control signal and the directly subsequent detection of a control acknowledge bit, said last position being activated under the control of a control acknowledge bit received, the transmission means being deactivated under the control of the absence of a control acknowledge bit. Repetition generally does not make sense either when the control signal cannot be correctly received. Deactivation of the transmission means implies that the frame terminates. At a higher level of the organization, further correction steps can then be taken, if necessary.

The invention also relates to a master station, a master receiver station, a slave transmitter station, a slave receiver station, a transmitter station and a receiver station for use in a bus system of the kind set forth. Such a station can be realized as a single integrated circuit. In more complex situations a more extensive station comprising a local control system may be provided. Further attractive aspects are described in the dependent claims.

BRIEF DESCRIPTION OF THE FIGURES

The invention will now be described in detailed hereinafter with reference to some Figures. Therein

DESCRIPTION OF A PREFERRED EMBODIMENT

Figure 1:
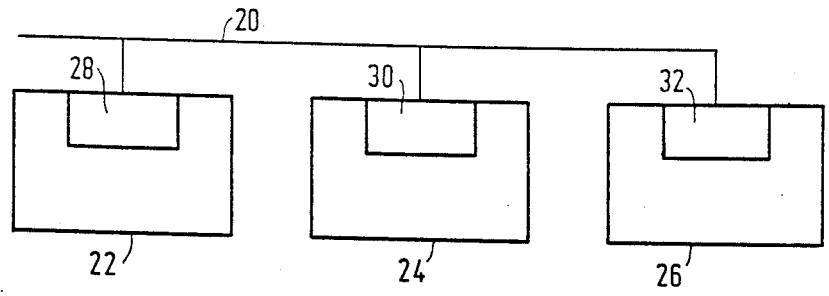
FIG. 1 is a general representation of a single-channel communication bus system.

FIG. 1 is a general representation of a single-channel communication bus system. Line 20 represents the channel, for example a twisted pair of conductors. There are provided three stations 22, 24, 26, each of which comprises a respective interface circuit 28, 30, 32. The stations may be of various complexities. As field of application may be intended, for example communicating control signals between apparatus and facilities in a house or apartment. Apparatus of this kind may be simple or complex, for example a television receiver, an audio recorder, a washing machine, a microwave oven, a central timer, a sensor for ambient temperature/solar radiation, control circuitry for air treatment, an illumination (sub)system. The invention does not relate to the functions of these apparatus. For controlling this function sometimes a local control system will be present comprising a microcomputer, sensor, drivers, A/D, D/A converters, a memory, I/O equipment. This equipment will not be described for the sake of simplicity. Some apparatus will act as a master station vis a vis the bus, and other apparatus as a slave station. Some apparatus act as transmitters of data, and some apparatus as receivers. Furthermore, a variety of mixed or alternating situations can occur. The operations described below take place on the communication bus system and are executed by the interface circuits.

DESCRIPTION OF THE BUS PROTOCOL

Figure 2:
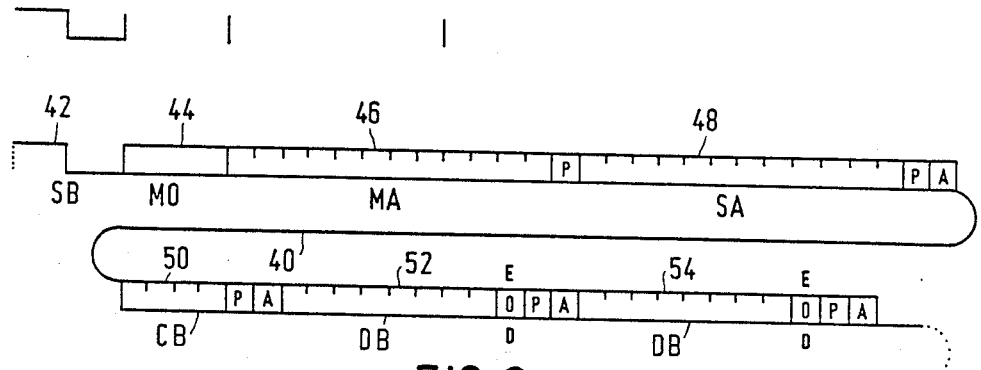
FIG. 2 shows the structure of a communication operation.

FIG. 2 shows the structure of a communication operation at the data level. For the form of data bits and other bits, reference is had to the citation. The Figure shows the time in the form of a meandering line 40 along which the bit cells are assumed to be arranged in an adjacent manner. The reference numeral 42 indicates the start bit. The reference numeral 44 concerns the mode indicate which indicates the bit rate at which subsequently data is to be transmitted; this concerns 3 bits at the most. A limited number of standardized transmission frequencies have been defined. The reference numeral 46 indicates the address of the relevant master station; this address contains 12 bits, followed by a parity bit P. An arbitration operation is performed on the start bit, on the mode indication, on the master address. Stations which are late with their start bit withdraw themselves again. For the mode bits the lowest (= slowest) mode prevails. For the addresses the station having the highest priority prevails. Mode indication and master address together constitute a priority signal. After the transmission of the master address, only one master station remains. This station subsequently transmits the slave address 48. This address contains 12 address bits, one parity bit P and space for an address acknowledge bit A. When a slave station recognizes its own address, it transmits an address acknowledge bit in the block A. When the latter bit is not received, the intended slave station is either absent or does not operate, or the address has an incorrect parity. No distinction is made between these three possibilities. In that case the frame shown in FIG. 2 is immediately terminated. When the acknowledgement by the slave station is correct, the master station transmits a control signal 50. This signal contains four control bits, one parity bit P and space for a control acknowledge bit A. The treatment of the P and A bits is identical to that in the case of the slave address. If the control acknowledge bit does not appear, the frame is directly terminated by the master station. When the acknowledgement by the slave station is correct, a data byte is transmitted (52). For the time being the description will be based on a master transmitter station. The data byte contains 8 bits, a signaling "last" data byte (EOD), one parity bit P and space for a data acknowledge bit A. The EOD signaling indicates that the transmitter station consider the byte concerned as the last byte or as a non-last byte of the frame. The frame length amounts to at the most 2 bytes in the mode 0; in the mode 1 it amounts to 32 bytes (master station) or 16 bytes (slave station); in the mode 2 it amounts to 128 bytes (master station) or 64 bytes (slave station), but shorter messages are also permissible. The parity bit P has the same function as previously described, but is determined also on the basis of the EOD bit. If the data acknowledge bit is not received, there may be a variety of reasons: a parity error, slave station deactivated since the reception of the control signal 50, or slave station incapable of receiving and buffering the data byte, for example because the processing of the data had taken too much time. In all these cases the master station is set to the repeat state. In this state the relevant data byte, including the facilities for EOD, P, A, is repeated until ultimately the data acknowledge bit is received. Then, if the relevant data byte was not the last byte, the repeat state is left and the next data byte is transmitted (for example 54). If, however, it was the last data byte, the frame and the message are terminated. Subsequently a new message/frame may commence. Upon transmission of a data byte, each time a counter position is incremented. When the counter reaches the maximum frame length, or when the message is completed, the "last" data byte is indicated (the first one of the two limits occurring is decisive). The frame is terminated after the "last" byte. If the data acknowledge bit is not correctly received after the "last" byte, the "last" byte is repeated, for as long as it fits within the defined frame length. When the message has not yet been completed when the maximum frame length is reached, a new frame is started. The first data byte thereof is taken as the first not yet transmitted data byte of the message, or as the data byte for which no correct data acknowledge bit had yet been received. Consequently, this implies no double transmission of a data byte already transmitted successfully. If necessary, the "lock" mechanism can be used in this respect, so that the relevant slave remains reserved for the actual transmission. This will be described in detail hereinafter. According to this lock mechanism, a master station having a higher priority can meanwhile obtain the monopoly over the bus, but cannot gain access to the slave station that had been locked. This organization simplifies the procedure in the slave station (usually having a comparatively simple construction).

The described organization can also be used with a master receiver and slave transmitter organization. In as far as the data bytes and associated parity bits are concerned, the transmission direction is then reversed. This also holds for the transmission direction of the data acknowledge bits.

FURTHER ORGANIZATIONS

The master station can set/reset the lock flag at the slave by means of a given control signal, thus instructing the slave to listen only to the master station concerned. The slave station is released by the master station in that the latter transmits a 1-byte frame, containing the release command. The lock flag should be set/reset by the slave after at least 1 byte of the latter frame has been correctly transmitted.

A slave address acknowledge bit is not given if:
the slave is absent
the slave cannot handle the mode (speed) of the frame
a parity error occurs in the master address and/or slave address
timing is incorrect, causing bus errors, so that synchronization or parity errors occur.

The master responds to a negative address acknowledge bit by either
repeating the frame, possibly in a lower mode
requesting the status for the relevant slave in the mode 0 possibly repeatedly). The highest mode in which the slave can operate is derived from the status. Subsequently the message is repeated in the highest feasible mode.

When the transmission repeatedly stops at the negative slave address acknowledge bit, it must be concluded that the slave is absent. In that case further repetition does not make sense. A control acknowledge bit is not given in the case of:
parity error
timing error
inability of the slave to execute the requested function.

The master responds by repeating the message in first instance. If again no control acknowledge bit is received, it requests the master station at the slave in order to determine why it did not receive this acknowledge bit.

A negative data acknowledge bit is caused by:

parity error
timing error
full receiver buffer.

In the case of a parity error or in the case of a full receiver buffer, this byte will be repeated, for as possible, until either the byte has been acknowledged or the frame length has been used up. It the byte has not been transmitted within the frame, a new frame will have to be initiated for this byte (and the next, if applicable) byte. Preferably, data bytes which have been successfully transmitted will not be repeated in such a new frame. As a result, the transport speed remains high.

The following control signals are defined:

HEX 0(0000): read the status of the interface circuit of the slave station. If this operation is not followed by an acknowledge signal, the conclusion is that the interface circuit of the slave station is defective. The inferface circuit of the master station then signals this defect to the control system of the master station (for example, one of the previously mentioned apparatus). If correct acknowledgement is received, the slave station subsequently outputs a data byte in which its status is mapped.

HEX 2(0010): read the status and apply the lock signal to the slave station. When the slave station is locked by another master station, this circumstance is signalled in the data byte; the requesting, master must attempt again; this is signalled to the control system of the master station.

HEX 3(0011): read data and apply the lock signal to the slave station. The data response is the status, specified as follows:

bit 0=0: the transmitter buffer of the slave station is empty; this is signalled to the control system.

bit 2=1: the slave station is locked by another station; the control system receives the instruction to attempt again.

bit 4=0: the slave station cannot transmit data; this is signalled to the control system. In all other cases for the bits 0, 2, 4 a new frame is initiated with the same control code.

HEX 4(0100): read the two least-significant tetrades of the address whereby the slave station is locked. If the slave station is not locked, this fact is signalled to the control system of the master.

HEX 5(0101): ditto for the most-significant tetrade.

HEX 6(0110): read the status of the slave and release. If the slave station is locked by another station, the control system is instructed to make a new attempt.

HEX 7(0111): read the data and release. Except for the release, this corresponds to the code 0011.

HEX 8(1000)": write possession requet; this implies a query for the status of the control system of the slave station. When the status is read:

bit 1=1: the receiver buffer of the slave is not empty; signal to the control system of the master station.

bit 2=1: as above.

bit 3=0: slave does not have a memory; signal to control system. If none of the three bits has a result, a new attempt is made.

HEX A(1010): writer command and lock. Subsequently the status is read. Bits 1, 2 as above; if none of these bits has a result, a new attempt is made.

HEX B (1011): write data and lock. Subsequently the status is read; remainder is identical to A.

HEX E (1110): write command and release; remainder is identical to A. HEX F (1111): write data and release; remainder is identical to A.

At the end of each frame the transmitting station (slave station or master station) checks whether all necessary bytes have been transmitted. If this is not the case, the master station starts a new frame and the transmitting station loads the remaining bytes into the local transmitter buffer.

DESCRIPTION OF AN INTERFACE CIRCUIT

Figure 3:
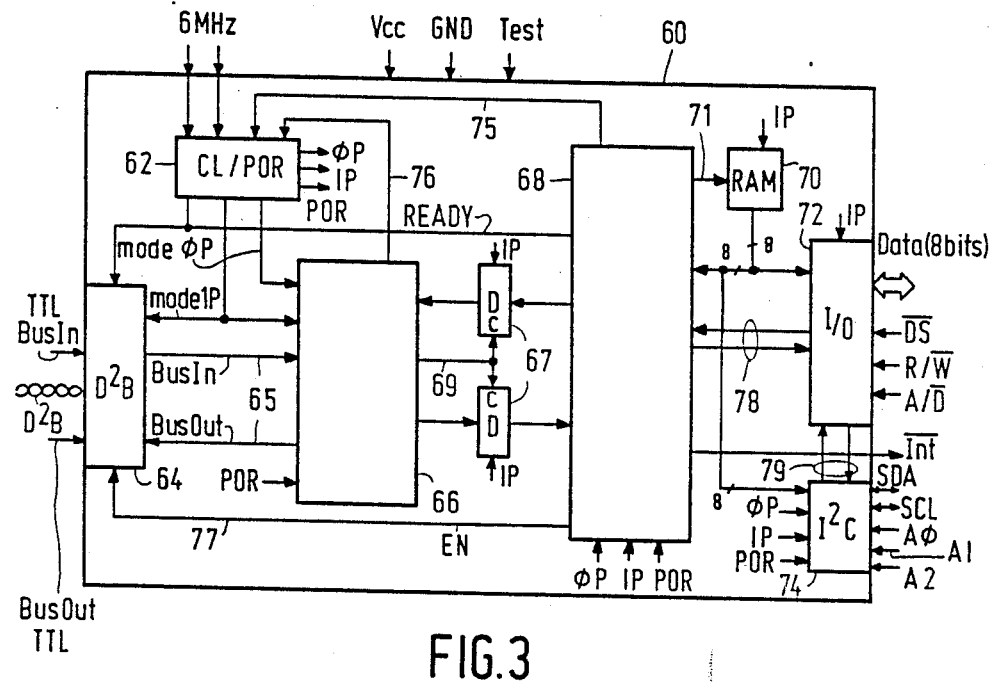
FIG. 3 shows an embodiment of an interface circuit.

FIG. 3 shows an embodiment of an interface circuit. The circuit (60) comprises the following connections, viewed clock-wise from the oscillator (6 MHz):

power supply VCC, ground GND, test control test, 8 bits data for the local control system, with a synchronization (strobe) pin $\overline{DS}$, read/write control $R/\overline{W}$, selection between adress and data $(A/\overline{D})$, an interrupt signal Int, an I$_2$C connection (in this case of no further importance), three preset address bits therefor (A$\phi$, A1, A2), (cf. U.S. Pat. No. 4,689,740) two lines for data at the TTL level, and a twisted wire pair for the single-channel communication (D$^2$B) as described above. Element 62 comprises the clock and the control components for the resetting of the circuit when the supply voltage appears (power-on reset). A chip-ready signal, the POR signal and the clock signals $\phi$P, 1P originate herefrom. The "ready" signal indicates that the circuit is operational again after power on and reset.

Block 64 is a circuit for the filtering, detecting and controlling of signals on the D$^2$B and TTL lines. The data contents of the signals on D$^2$B and TTL are identical, except for the following electrical differences: TTL is unidirectional versus D$^2$B which is bidirectional, and the voltage level differs. On lines 65 the line bits are transported at the TTL level. In block 66 a translation takes place between the line bits and the logic bits. The block 67 constitute two unidirectional latch circuits between the blocks 66 and 68. Line 69 carries a signal for activating the next bit series. Block 68 constitutes the core of the interface circuit. Therein the parity bits are formed, the acknowledge bits are detected and the various control bits and status bits are analyzed or stored for interrogation, if any. Furthermore, the information is exchanged with the control system and the interaction with RAM buffer 70 is organized. Buffer 70 has a data width of 8 bits; the number of bytes is determined by the application. The addresses appear on line 71; block 72 is a data gate having a width of 8 bits for connection to the local control system (not shown). Block 74 is an interface unit for an I$^2$C bus. The associated protocol is described in U.S. Pat. No. 4,680,740; for a proper understanding of the circuit, therefore, this I$^2$C bus need not be further described. The signals mode $\phi$P, mode 1P are secondary clock signals having the same frequency as $\phi$P, 1P, or a frequency which is a factor 4 lower, depending on the operating mode on the external bus D$^2$B. Line 76 controls the switching over of the clock to the bit level (for the various bit lengths) which need not be the same for the start bit, mode/address/control bits and data bits. Line 75 has the same function at the frame level. Line 77 is an enable line (EN); lines 78 provide synchronization handshake, and so do the lines 79.

In a simple embodiment the circuit is suitable for use in the mode 0 and 1; moreover, it is suitable for master operation as well as the slave operation. After a reset signal (power-on-reset, POR), the circuit is initialized. The microprocessor can make the address of the circuit available to the D²B bus by the loading of some free-accessible registers. Moreover, some flag bits which indicate the capacities of the application are set (when a local memory is present and the slave station can also act as a transmitter). The signal POR also causes an interrupt signal for the local control system (usually a microprocessor). The bus status of the slave part of the circuit is stored in the slave status register. When the circuit is locked by another station, the address of the latter station is stored in the lock address register. In order to activate a circuit as a master station, the control circuit of the application should provide the following information:

the slave station address, the control code and, in the case of a write operation, the data bytes to be transmitted in order to be loaded into the master station buffer, the mode signal, indicating the line mode to be used, and the master station request signal are loaded into the master station command register.

The station subsequently initiates a message and participates, if necessary, in the relevant arbitration procedure. When the frame is terminated after a positive arbitration result, an interrupt signal for the local control system (INT) is given. The local control system can subsequently read the reason of the interrupt signal in the interrupt register (master interrupt, slave transmitter interrupt or slave receiver interrupt). The master status register contains the number of positive acknowledge493 successful. The latter register thus acts as a counter. Moreover, after an interrupt signal in the case of a read operation, the master buffer contains the data received. The interrupt register is reset after having been read.

Virtually the same operations are performed for a slave receiver function. The number of positive acknowledge bits is then stored in the slave receiver register. When the slave receiver buffer has been read, the slave receiver command register is filled with the information OOF.

What is claimed is:

1. A single-channel communication bus system whereto a series of stations are connected, that is to say at least one master station and at least one slave station, each master station comprising arbitration means for transmitting a start signal, followed by a priority signal, and for detecting a negative or a positive arbitration result, in reponse to the start and/or priority signal of any other station, and also comprising transmission means for transmitting a message signal after having a positive arbitration result, characterized in that the transmission means have a first state for transmitting a slave station address and for the directly subsequent detection of an address acknowledge bit, and also have a last state for transmitting a series of data bytes, each time cum signalling of a "last" data byte, and for the directly subsequent detection of a data acknowledge bit, in that under the control of an address acknowledge bit received there is activated a next state, however, the transmission means being deactivated in the absence of an address acknowledge bit, and in that under control of an absent data acknowledge bit the transmission means are set to a repeat state for the relevant data byte in order to assume the last state again under control of the data acknowledge bit when received, the transmission means also being deactivated when an upper limit for the number of data bytes transmitted, is reached.

2. A bus system as claimed in claim 1, characterized in that the transmission means assume a control state, under the control of the address acknowledge bit, for the transmission of a control signal and the directly subsequent detection of a control acknowledge bit, said last state being activated under the control of a control acknowledge bit received, the transmission means being deactivated under the control of the absence of a control acknowledge bit.

3. A station for use in a bus system as claimed in claim 2, characterized in that the control signal consists of four bits.

4. A station for use as a master station in a bus system as claimed in claim 1 or 2, characterized in that the transmission means has a data receiving state occurring, in conjunction with the first, next, and repeat states, and occurring in place of and at different times from the last state, the data receiving state being for receiving a series of data bytes, each data byte including means for signalling a "last" data byte, and for immediately subsequently transmitting a further acknowledge bit in the case of correct reception.

5. A station for use as a slave station as a counterpart of a master station as claimed in claim 4, characterized in that it comprises further transmission means having, as a counterpart to of said data receiving state, a data transmission state for the transmission of a series of data bytes cum signalling of a "last" data byte and for the directly subsequent detection of said further data acknowledge bit, the further transmission means being set to a repeat state for the relevant data byte under the control of the absence of a further data acknowledge bit in order to assume the data transmission state again under the control of the further data acknowledge bit received as yet, the further transmission means being deactivated upon attaining a second upper limit as regards the number of transmitted data bytes.

6. A transmitter station for use in a bus system as claimed in claim 2, characterized in that a series of data bytes to be transmitted as a unit is signalled by a control signal indicating a lock signal.

7. A transmitter station as claimed in claim 6, characterized in that the last data byte of said series is transmitted in a separate message, the control signal of which indicates an unlock signal.

8. A receiver station for use with a transmitter station as claimed in claim 6 or 7, characterized in that after said lock signal a first correctly received data byte validates said lock signal.

9. A receiver station for use with a transmitter station as claimed in claim 7, characterized in that after said unlock signal a first correctly received data byte indicates the end of said series.

10. A transmitter station as claimed in claim 6 or 7, characterized in that, after the correct acknowledgement of a transmitted data byte, unconditionally the next data byte of the series is transmitted as the next data byte, regardless of the possible occurrence of the end of the relevant message.

11. A transmitter station as claimed in claim 6 or 7, comprising counting means for summing the number of acknowledge bits received, per meassage.

12. A master station for use in a single-channel communication bus system whereto a series of stations are connected, which series includes at least one master station and at least one slave station, the master station comprising
(a) arbitration means for transmitting a start signal, followed by a priority signal, and for detecting a negative or a positive arbitration result depending on a start and/or a priority signal from any other station, and
(b) transmission means for transmitting a message signal after having a positive arbitration result, the transmission means having:
(i) a first state for transmitting a slave station address and for immediately subsequently detecting an address acknowledge bit,
(ii) a last state for
(A) transmitting a series of data bytes,
(B) signalling a "last" data byte, and
(C) immediately subsequently detecting a data acknowledge bit,
(iii) a next state, activated under control of a received address acknowledge bit, the transmission means being deactivated in the absence of the address acknowledge bit, and
(iv) a repeat state, to which the transmission means is set, under control of an absent data acknowledge bit, for a current data byte, the transmission means resuming the last state when the data acknowledge bit is received, the transmission means also being deactivated when a upper limit for a number of data bytes transmitted is reached.

13. The master station of claim 12, wherein the transmission means assume a control state, under control of the address acknowledge bit, for transmitting a control signal and immediately subsequently detecting a received control acknowledge bit, the transmission means being deactivated under control of the absence of the control acknowledge bit.

14. The master station of claim 13, wherein the control signal has four bits.

15. The master station of claim 13, wherein the transmission means comprises a data receiving state, which occurs, in conjunction with the first, next, and repeat states, and occurs in place of and at different times from the last state, the data receiving state being for receiving a series of data bytes, each data byte including means for signalling a "last" data byte", said receiving state being further for immediately subsequently transmitting a further data acknowledge bit in the case of correct reception.

16. The master station of claim 12, wherein the transmission means comprises a data receiving state, which occurs, in conjunction with the first, next, and repeat states, and occurs in place of and at different times from the last state, for receiving a series of data bytes, each data byte including means for signalling a "last" data byte", said receiving state being further for immediately subsequently transmitting a further data acknowledge bit in the case of correct reception.

17. A single channel bus system comprising a master station as claimed in claim 15 or 16 further comprising a slave station which comprises:
further transmission means having,
(i) as a counterpart of the data receiving state, a data transmission state for transmitting a series of data bytes, each data byte including means for signalling a "last" data byte and for immeditely subsequently receiving the further data acknowledge bit, and
(ii) a repeat state, to which the further transmission means is set, for a current data byte, under control of the absence of the further data acknowledge bit, the further transmission means resuming the data transmission state when the further data acknowledge bit is received,
the further transmission means being deactivated upon attaining a second upper limit on a number of transmitted data bytes.

18. The system of claim 2, wherein the control signal includes a lock signal.

19. A station for use in a single channel bus system whereto a series of station are connected, which series of stations includes a master station and at least one slave station, the master station including arbitration means for transmitting a start signal, followed by a priority signal, and for detecting a negative or a positive arbitration result, depending on the start and/or priority signal of any other station, which station includes:
(I) means for interpreting and responding to a message signal, which message signal includes
(a) a first part including a slave station address and an immediately following space for an address acknowledge bit;
(b) a last part including a series of data bytes, each data byte including means for signalling a "last" data bytes and being followed by a space for data acknowledge bit; and
(c) a control signal followed by space for a control acknowledge bit.

20. The station of claim 19, wherein the station is a slave station having a respective address, which slave station, upon recognition of the respective address, supplies the address acknowledge bit.

21. The station of claim 20, wherein the slave station, upon receipt of a data byte, supplies the immediately following data acknowledge bit.

22. The station of claim 21 further comprising transmission means having:
(i) a data transmission state for transmitting a series of data bytes in the last part, each data byte including means for signalling a "last" data byte and for immediately subsequently receiving a further data acknowledge bit, and
(ii) a repeat state, to which the transmission means is set, for a current data byte, under control of the absence of the further data acknowledge bit, the transmission means resuming the data transmission state when the further data acknowledge bit is received,
the transmission means being deactivated upon attaining an upper limit on a number of transmitted data bytes.

23. The station of claim 19, wherein the station is a transmitter station supplying the message signal and setting the control signal to indicate a lock signal.

24. The station of claim 23, wherein the last data byte of said series is transmitted in a separate message, the control signal of which indicates an unlock signal.

25. The station of claim 19, wherein
the station is a receiver station receiving the message signal, and
the control signal indicates a lock signal.

26. The station of claim 25, wherein the receiver receives the last byte in the series in a separate message signal, the control signal of which indicates an unlock signal.

27. The station of claim 26, wherein after said unlock signal, the receiver recognizes the first correctly received data byte as indicating the end of the series.

28. The station of claim 23 or 24, wherein after correct acknowledgement of a transmitted data byte, unconditionally the next data byte of the series is transmitted as the next data byte regardless of the possible occurrence of the end of the relevant message.

29. The station of claim 23 or 24, comprising counting means for summing a number of acknowledge bits received per message.

30. The station of claim 28, comprising counting means for summing a number of acknowledge bits per message.

31. A transmitter station as claimed in claim 10, comprising counting means for summing the number of acknowledge bits received, per message.

32. A method for transmitting a message signal in a single channel bus system which includes a master station and a slave station, the method comprising the steps of:

(a) transmitting a slave address followed by space for an address acknowledge bit;
(b) transmitting a control signal followed by space for a control acknowledge bit;
(c) testing for acknowledgement of the slave address and the control signal, and upon a negative result aborting;
(d) transmitting a series of data bytes, each including means for signalling a "last" byte and followed by space for a data acknowledge bit;
(e) testing for acknowledgement of each data byte, and upon a negative result repeating transmission of that data byte; and
(f) testing for an upper limit number on the series of data bytes, and upon a positive result halting transmission of the message signal.

33. The method claim 32 further comprising the step of transmitting a second message signal including slave address, space for address acknowledge bit, control signal, space for control acknowledge bit, data byte and space for data acknowledge bit, when a message started in the message signal does not fit within a single frame.

* * * * *